(12) United States Patent
Lemmey et al.

(10) Patent No.: US 8,994,779 B2
(45) Date of Patent: *Mar. 31, 2015

(54) INFORMATION MIXER AND SYSTEM CONTROL FOR ATTENTION MANAGEMENT

(75) Inventors: Tara Lemmey, San Francisco, CA (US); Nikolay Surin, San Francisco, CA (US); Stanislav Vonog, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/554,948

(22) Filed: Jul. 20, 2012

(65) Prior Publication Data

US 2013/0021431 A1      Jan. 24, 2013

Related U.S. Application Data

(63) Continuation-in-part of application No. 13/433,199, filed on Mar. 28, 2012.

(60) Provisional application No. 61/468,567, filed on Mar. 28, 2011.

(51) Int. Cl.
| | | |
|---|---|---|
| *H04N 7/14* | (2006.01) | |
| *H04N 21/472* | (2011.01) | |
| *H04N 21/4788* | (2011.01) | |
| *H04N 21/485* | (2011.01) | |
| *H04M 3/56* | (2006.01) | |
| *H04N 7/15* | (2006.01) | |

(52) U.S. Cl.
CPC ......... *H04N 21/47205* (2013.01); *H04M 3/567* (2013.01); *H04M 3/568* (2013.01); *H04N 7/15* (2013.01); *H04N 21/4788* (2013.01); *H04N 21/485* (2013.01)
USPC ..................................... 348/14.08; 348/14.07

(58) Field of Classification Search
USPC .......... 348/14.02–14.03, 14.08, 14.01, 14.07; 379/202.01
See application file for complete search history.

(56) References Cited

U.S. PATENT DOCUMENTS

| | | | |
|---|---|---|---|
| 6,026,164 A * | 2/2000 | Sakamoto et al. | 380/217 |
| 6,304,648 B1 * | 10/2001 | Chang | 379/202.01 |
| 7,370,342 B2 | 5/2008 | Ismail et al. | |
| 8,849,701 B2 | 9/2014 | Willis et al. | |
| 2002/0029350 A1 * | 3/2002 | Cooper et al. | 713/200 |

(Continued)

OTHER PUBLICATIONS

International Search Report and Written Opinion of PCT Application No. PCT/US2013/034477 mailed Jul. 29, 2013.

(Continued)

*Primary Examiner* — Olisa Anwah
(74) *Attorney, Agent, or Firm* — Perkins Coie LLP

(57) ABSTRACT

Systems and methods for controlling various aspects of ensemble experiences and system control for attention management are disclosed. In some embodiments, the disclosure contemplates a variety of improved methods and systems for control of an ensemble experience such as a sports game, a large scale event, or a video conference. One or more interface(s) are provided that may present multiple layers and/or channels of communication, e.g., multiple video and audio. Options may be provided for participants to adjust the overall audio volume and assign different weights to audio signals from group layer(s), content layer, and system layer.

31 Claims, 14 Drawing Sheets

(56) References Cited

U.S. PATENT DOCUMENTS

| | | | |
|---|---|---|---|
| 2004/0109023 A1 | 6/2004 | Tsuchiya | |
| 2006/0206912 A1 | 9/2006 | Klarfeld et al. | |
| 2007/0168359 A1 | 7/2007 | Jacob et al. | |
| 2007/0242066 A1 | 10/2007 | Levy Rosenthal | |
| 2009/0086013 A1* | 4/2009 | Thapa | 348/14.08 |
| 2009/0307614 A1 | 12/2009 | Craig et al. | |
| 2010/0043040 A1 | 2/2010 | Olsen, Jr. | |
| 2010/0188473 A1* | 7/2010 | King et al. | 348/14.02 |
| 2010/0316232 A1* | 12/2010 | Acero et al. | 381/92 |
| 2011/0047487 A1 | 2/2011 | Deweese et al. | |
| 2011/0246908 A1 | 10/2011 | Akram et al. | |
| 2011/0301760 A1* | 12/2011 | Shuster et al. | 700/264 |
| 2012/0002001 A1 | 1/2012 | Prentice | |

OTHER PUBLICATIONS

International Search Report mailed Oct. 30, 2012, of PCT Application No. PCT/US2012/031013, 3 pages.

Written Opinion mailed Oct. 30, 2012, of PCT Application No. PCT/US2012/031013, 3 pages.

Co-Pending U.S. Appl. No. 13/433,199 of Lemmey et al., filed Mar. 28, 2012.

Co-Pending U.S. Appl. No. 13/529,196 of Lemmey et al., filed Jun. 21, 2012.

Co-Pending U.S. Appl. No. 13/529,228 of Lemmey et al., filed Jun. 21, 2012.

International Searching Authority, International Search Report for International Application PCT/US2013/034477, mailed Jul. 29, 2013.

Non-Final Office Action mailed Feb. 10, 2014, for U.S. Appl. No. 13/433,199 of Lemmey, T., et al. filed Mar. 28, 2012.

Non-Final Office Action mailed Aug. 27, 2014, for U.S. Appl. No. 13/433,199 of Lemmey, T., et al. filed Mar. 28, 2012.

Restriction Requirement mailed Jun. 13, 2014, for U.S. Appl. No. 13/529,196 of Lemmey, T., et al., filed Jun. 21, 2012.

Non-Final Office Action mailed Jan. 7, 2015, for U.S. Appl. No. 13/529,196 of Lemmey, T., et al., filed Jun. 21, 2012.

\* cited by examiner

INFORMATION MIXER AND SYSTEM CONTROL FOR ATTENTION MANAGEMENT

CROSS-REFERENCE TO RELATED APPLICATIONS

This application is a Continuation-in-Part (CIP) of U.S. patent application Ser. No. 13/433,199, filed on Mar. 28, 2012, and entitled "INFORMATION MIXER AND SYSTEM CONTROL FOR ATTENTION MANAGEMENT", which application claims priority to U.S. Provisional Application 61/468,567, entitled METHODS AND SYSTEMS FOR CONTROLLING AN ENSEMBLE EXPERIENCE, filed Mar. 28, 2011, both of which are hereby incorporated by reference in their entirety.

TECHNICAL FIELD

The present disclosure relates to controlling various aspects of ensemble experiences, such as the audio portion or the video portion of a video chat experience, in an intuitive, real life manner, and system control for attention management.

BRIEF DESCRIPTION OF DRAWINGS

These and other objects, features and characteristics of the present disclosure will become more apparent to those skilled in the art from a study of the following detailed description in conjunction with the appended claims and drawings, all of which form a part of this specification. In the drawings:

DETAILED DESCRIPTION

Figure 1:
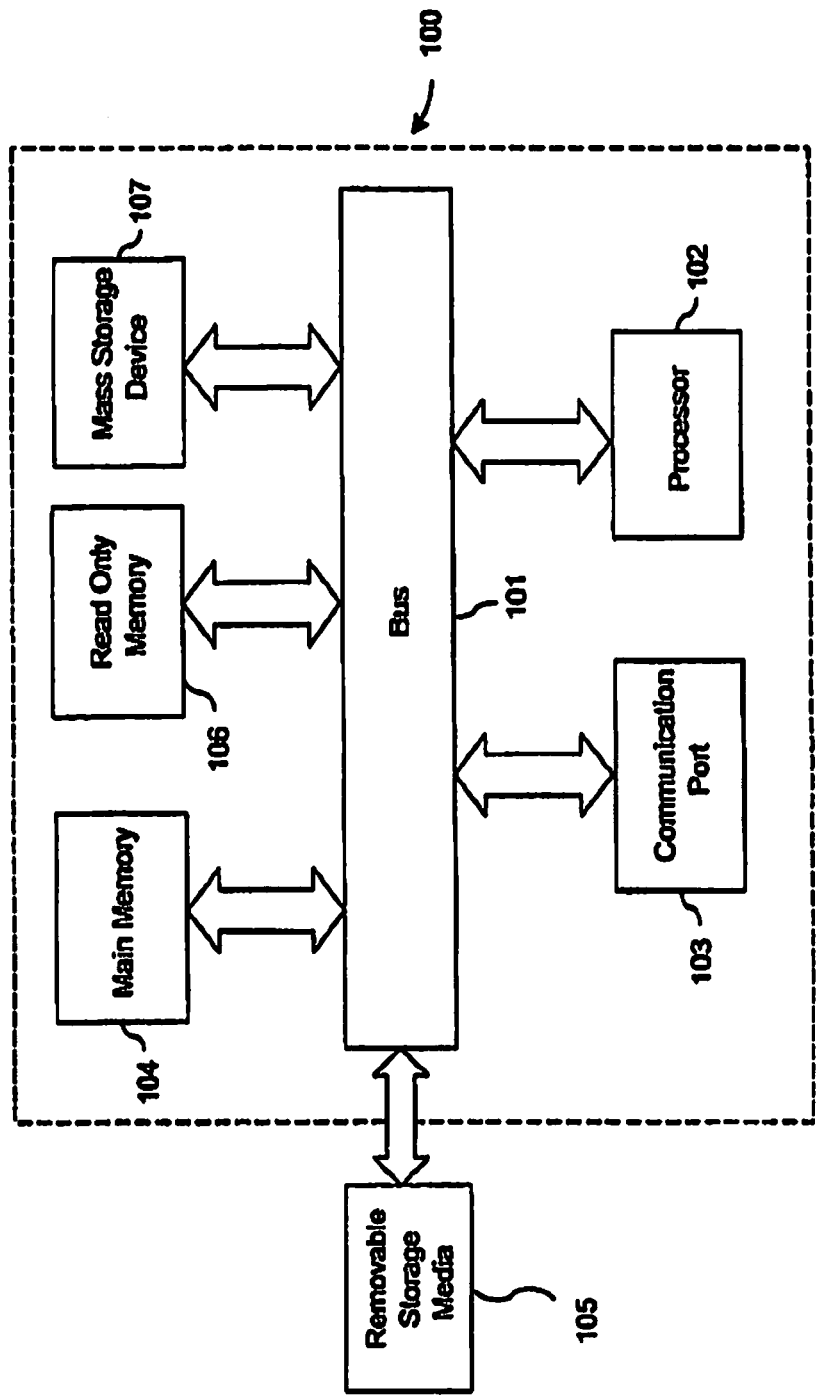
FIG. 1 illustrates an exemplary server or a client system according to one embodiment(s) of the present disclosure.

Systems and methods for controlling various aspects of ensemble experiences and system control for attention management are described. In some embodiments, the present disclosure contemplates a variety of improved methods and systems for control of an ensemble experience such as a sports game, a large scale event, or a video conference. One or more interface(s) may be provided that may present multiple layers and/or channels of communication, e.g., multiple video and audio.

In accordance with various embodiments, multiple objects such as video chat windows may be manipulated by a specific participant (e.g., the local participant) to control the audio signal. Take for example a specific participant experiencing a video conferencing embodiment comprised of multiple video layers or video chat windows, one of which represents the specific participant, others which represent other participants, and perhaps a base video layer of primary content. The volume of other participants on the specific participant's device may be a function of the proximity of the video chat windows of the other participants with respect to the window representing the specific participant, and/or a function of the size of the video chat windows. The specific participant may manipulate the windows within their display, and thus the audio signal, to have an intuitive effect on how the participant experiences the different layers within the ensemble experience. For example, the closer other participants are to the specific participant, the louder they may be. This could be embodied as a discrete function, e.g., the specific participant may only hear those participants whose windows are immediately to the left and right, and all other participants may be muted. Alternatively, the volume may decrease as a function of distance.

In some embodiments, a specific participant may experience a large scale event involving thousands or millions of other participants. For example, a large number of ensemble participants may watch a world cup soccer game or an Academy Award together. A graph may be provided to a specific participant to show how many other participants involved in the event. The specific participant may be provided an audience representation layer or "swell" interface appearing translucently over the base layer. In some embodiments, a variety of other layers and dimensions, such as multiple content layers, video chat layers, etc. may be provided to the specific participant. The specific participant may express emotions such as approval or disapproval via action suitable for detection, such as "applause" or "boo" etc. The specific participant's feedback, including audio feedback, may be provided to at least one other participant. In some embodiments, the audio feedback may swell or diminish as a function of factors, such as an intensity of participation from the specific participant, and a number of active participants.

Some embodiments may provide layers and/or dimensions for a specific participant to select or invite other participants to join an ensemble event or a sub-group of the ensemble event. Participants who are friends of the specific participant may join the sub-group even without invitations. In some embodiments, participants who have a friend in the sub-group of an ensemble event may join without invitations. In other embodiments, participants may be provided options to pay a fee to join an ensemble event or a sub-group of the ensemble event.

In some embodiments, small icons indicating available online ensemble events may be provided on the screen of a specific participant's device(s). The participant may select an icon to open a new content layer and join a new ensemble event associated with the icon. Once joining the new ensemble event, the specific participant may view the base video layer of primary content and objects/windows representing the existing participants in the new ensemble event. In some embodiments, a chat interface or layer may be provided to all participants of an ensemble event. The chat interface/layer may notify all existing participants the arrival of a new participant or the departure of an existing participant. A friend of the specific participant may choose to greet the specific participant upon his or her arrival. In some embodiments, the specific participant may choose to quit the old ensemble event or move the old ensemble event to another screen or another device of the participant if the specific participant has multiple devices/screens.

In some embodiments, a specific participant may be provided a customized participation layer or interface to manage his/her expression in video and/or audio signals and effect how other participants perceive the expression from the specific participant. For example, the specific participant may effect how other participants perceive the volume of his or her audio. In some embodiments, a specific participant may be provided options to manage attention from other participants by making his or her object/window translucent over other participants. For example, the specific participant may change the color of the object/window perceived by others or temporarily make the object/window swell, and/or flash to draw attention from other participants. In some embodiments, the size of object/window and the volume of audio from a specific participant may be used to indicate the specific participant's influential level in an ensemble event. More active a specific participant in an ensemble event, the size of his or her object/window may become bigger and his or her volume perceived by other participants may become louder.

In some embodiments, a participant may be provided options to draw attention from a specific participant by initiating an interaction with the specific participant. For example, the participant may throw an animated object, such as an egg or a tomato, etc., to a window/object of the specific participant. The specific participant may get the animated tomato or egg splashed on his or her screen. In some embodiments, the specific participant may be provided options to react by throwing an animated object back to the participant's window/object, or muting audio from the participant. In some other embodiments, a participant may be provided option to purchase a variety of animated objects and throw them at any specific participant to show some emotions, such as love, joy, anger, dissatisfaction, etc. For example, animated roses, diamonds, etc. may be provided to show love.

Some embodiments may provide an announcer or a sponsor in an ensemble event or a sub-group of the ensemble event. The announcer may be a specific participant, a celebrity, a sportscaster, an analyst, or a host of the ensemble event. In some embodiments, a participant may reduce or mute the volume from the announcer or a sponsor. In other embodiments, a participant may only reduce the volume of the announcer or the sponsor to a threshold volume but may not completely mute the volume from the announcer or the sponsor. In some embodiments, a participant may be provided with the option to completely mute the volume from the announcer or a sponsor by paying a fee. In other embodiments, a participant may be provided with the option to select an announcer that the participant likes and add the audio of the announcer by paying a fee.

In some embodiments, audio from the announcer may be a part of base layers. A participant may be provided an interface to manage the settings of base layers. For example, when the participant starts to talk, the volume of base layers may go down. When the participant stops talking, the volume of base layers may go up again. In some embodiments, the participant may add some of friends and/or celebrities in the settings of the base layers. When identified friends and/or celebrities start to talk, the volume of base layers may go down. When identified friends and/or celebrities stop talking, the volume of base layers may go up.

Some embodiments may provide layers and/or interfaces for a participant to select a synchronized mode with another participant or a group of participants. Participants in the same synchronized mode may have the same ensemble experience. For example, the group of participants may choose to sit in a row. If a participant X in the group speaks, participants sitting to the left of X may hear X's audio as if it sounds like X is to their right while participants sitting to the right of X may hear X's audio as if it sounds like X is to their left. As X speaks, all participants may have the same experience of X's speech.

In some embodiments, common interfaces and/or layers of a synchronized mode may be provided to all participants. The common interfaces and/or layers may include a video chat layer, a control layer, and/or a drawing layer, etc. Each participant may draw on the same drawing layer while others may see the drawings in real time. A specific participant may share a video on the video chat layer and allow other synchronized participants to watch the same video as the specific participant does. When the specific participant chooses to fast forward, skip, pause, or fast reverse the video, it may happen to the video chat layer of all participants in the synchronized mode.

Some embodiments may provide layers and/or interfaces for delivering targeted advertisements to a specific participant of an ensemble event. The specific participant's activities in the ensemble event may be constantly collected and analyzed. A targeted advertisement may be delivered to the specific participant based on his or her profile and/or the attention that he or she is focused on. For example, a participant X is constantly drawing global warming related subjects on the common drawing layer. A targeted advertisement related to art suppliers or clean energies may be displayed to X near the common drawing layer on X's screen.

In some other embodiments, the activities of the specific participant's friends in the ensemble event may also be analyzed and linked to target advertisements for the specific participant. A targeted advertisement may be delivered to the specific participant based on what the specific participant's friends are focused on or interested in. In some embodiments, a target advertisement may be deployed in conjunction with other options to draw attention from a specific participant.

In some embodiments, options may be provided for a specific participant to synchronize data stream between his or her multiple devices or multiple screens. The specific participant may choose to experience multiple ensemble events on multiple devices or screens. The specific participant may experience an ensemble event on one device or screen while experience another ensemble event on another device or screen. In some embodiments, one screen may be a system screen/device while the another screen may be a user screen/device. For example, a specific participant has two devices/screens, a TV and a tablet. The TV screen may be used to show TV and/or mix audio from participants of the ensemble event. The tablet may be configured to allow the specific participant to control his or her ensemble experience. The specific participant may use the tablet to switch channels, manage volumes, and/or track multiple ensemble events.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments of the present disclosure may also be downloaded as a computer program product or data to be used by a computer program product, wherein the program, data, and/or instructions may be transferred from a remote computer or mobile device to a requesting computer or mobile device by way of data signals embodied in a carrier wave or other propagation medium via a communication link (e.g., a modem or network connection). In some cases, parts of the program, data, or instructions may be provided by external networks such as the telephony network (e.g., Public Switched Telephony Network, cellular, Wi-Fi, and other voice, data, and wireless networks) or the Internet. The communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

For convenience, embodiments of the present disclosure are described with reference to a media filtering and manipulation application that may be used on a mobile device, a laptop, or other computing platform. Various embodiments are applicable to other operational models and applications, including different types of computing platforms, data gathering, filtering schemes, and filtering operations. For example, the ability to sort may be different for different service tiers (e.g., free-user vs. a fee based subscription). In some embodiments, the application may be linked to, or used within, social media communities or platforms. In addition, the features of many embodiments may be accessed by users using a software package or hardware device (with associated software or firmware) which may be directly installed on or connected to an end user's computer or mobile device. In some cases, access to the software and/or hardware device may be provided through various communication connections such as the Internet.

TERMINOLOGY

Brief definitions of terms used throughout this application are given below.

The terms "connected" or "coupled" and related terms are used in an operational sense and are not necessarily limited to a direct connection or coupling.

The term "embodiments," phrases such as "in some embodiments," "in various embodiments," and the like, generally mean the particular feature(s), structure(s), method(s), or characteristic(s) following or preceding the term or phrase is included in at least one embodiment of the present disclosure, and may be included in more than one embodiment of the present disclosure. In addition, such terms or phrases do not necessarily refer to the same embodiments.

If the specification states a component or feature "may", "may", "could", or "might" be included or have a characteristic, that particular component or feature is not required to be included or have the characteristic.

The term "module" refers broadly to software, hardware, or firmware (or any combination thereof) component. Modules are typically functional components that may generate useful data or other output using specified input(s). A module may or may not be self-contained. An application program (also called an "application") may include one or more modules, and/or a module may include one or more application programs.

The term "responsive" includes completely and partially responsive.

Exemplary Computer System

An exemplary computer system 100, representing an exemplary server or client system, with which various features of the present disclosure may be utilized, will now be described with reference to FIG. 1. In this simplified example, the computer system 100 comprises a bus 101 or other communication means for communicating data and control information, and one or more processors 102, such as Intel® Itanium® or Itanium 2 processors, coupled with bus 101.

Computer system 100 further comprises a random access memory (RAM) or other dynamic storage device (referred to as main memory 104), coupled to bus 101 for storing information and instructions to be executed by processor(s) 102. Main memory 104 also may be used for storing temporary variables or other intermediate information during execution of instructions by processor(s) 102.

Computer system 100 also comprises a read only memory (ROM) 106 and/or other static storage device coupled to bus 101 for storing static information and instructions for processor(s) 102.

A mass storage device 107, such as a magnetic disk or optical disc and its corresponding drive, may also be coupled to bus 101 for storing information and instructions.

One or more communication ports 103 may also be coupled to bus 101 for supporting network connections and communication of information to/from the computer system 100 by way of a Local Area Network (LAN), Wide Area Network (WAN), the Internet, or the public switched telephone network (PSTN), for example. The communication ports 103 may include various combinations of well-known interfaces, such as one or more modems to provide dial up capability, one or more 10/100 Ethernet ports, one or more Gigabit Ethernet ports (fiber and/or copper), or other well-known network interfaces commonly used in current or future Internet work environments. The communications ports 103 may also include specialized interfaces to provide a capability to interact with a variety of portable devices. In any event, in this manner, the computer system 100 may be coupled to a number of other network devices, clients, and/or servers via a conventional network infrastructure, such as an enterprise's Intranet and/or the Internet, for example.

Optionally, operator and administrative interfaces (not shown), such as a display, keyboard, and a cursor control device, may also be coupled to bus 101 to support direct operator interaction with computer system 100. Other operator and administrative interfaces may be provided through network connections connected through communication ports 103.

Finally, removable storage media 105, such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), zip disks, or USB memory devices, e.g., thumb drives or flash cards, may be coupled to bus 101 via corresponding drives, ports or slots.

In some embodiments, a system suitable for facilitating an ensemble event may include a plurality of portable devices such as Phones© and Android© devices, one or more local computing device, and one or more Internet connections coupling the portable devices to a cloud computing service. In some embodiments, a specific participant's feedback, including audio feedback, may be recognized and provided at the portable devices in conjunction with cloud computing service. For example, the system may provide an ensemble experience for a variety of participants. As the participants engage in the ensemble experience and provide feedback, the system may ascertain the variety of responses, feedback, and activities from the participants. When the situation merits, the system may facilitate participation, and provide a swell interface when appropriate. Each participant may have unique feedback associated with their actions. In some embodiments, the system may provide a customized participation layer or interface for each specific participant. The specific participant may customize his/her expressions in video and audio signals to manage attention from other participants in the same ensemble event.

Figure 2:
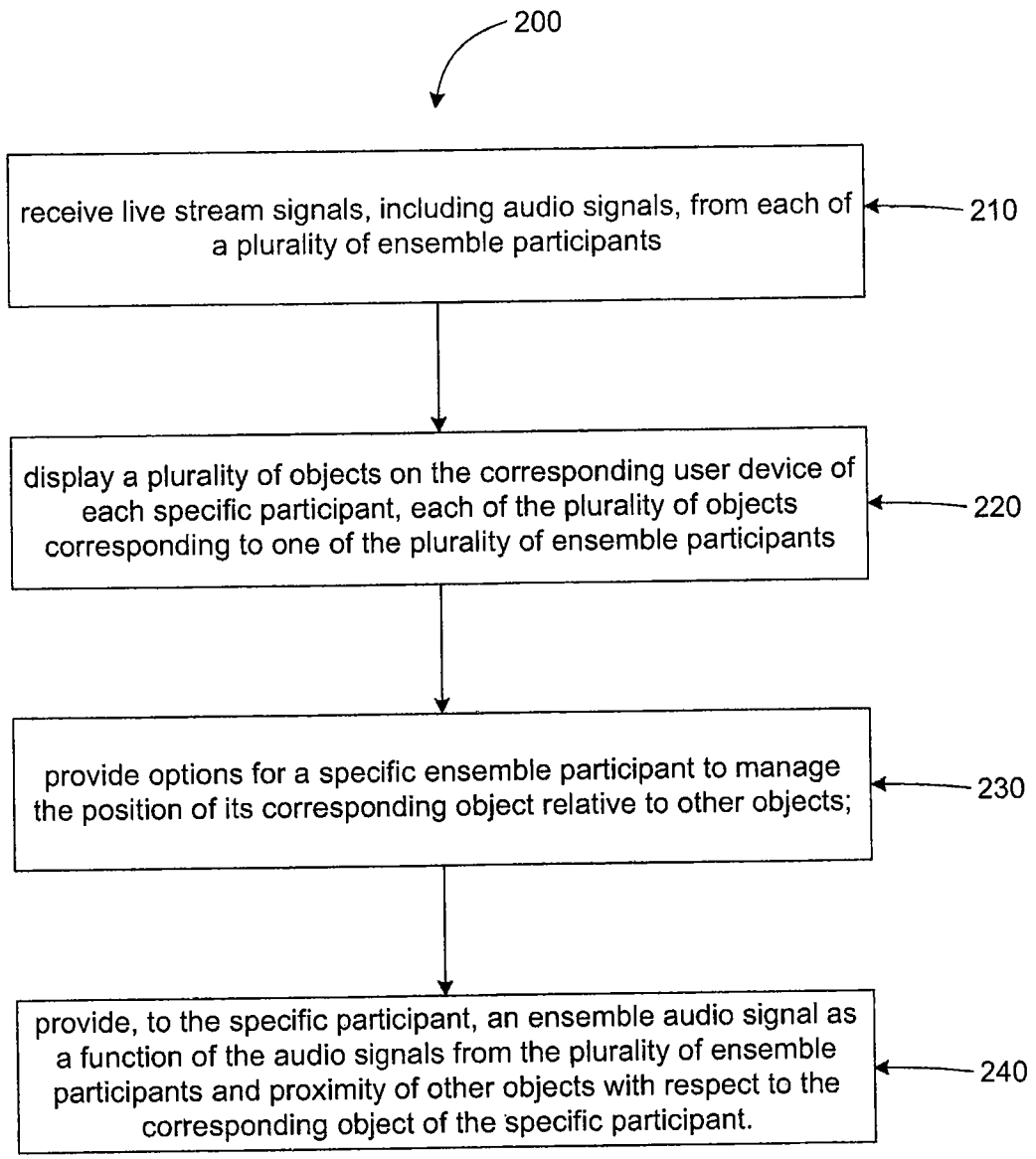
FIG. 2 illustrates a flowchart showing a set of exemplary operations 200 that may be used in accordance with another embodiment(s) of the present disclosure.

FIG. 2 illustrates a flowchart showing a set of exemplary operations 200 that may be used in accordance with another embodiment(s) of the present disclosure. As illustrated in FIG. 2, live stream signals, including audio signals, may be received from each of a plurality of ensemble participants at step 210. In some implementations, profile information may be requested from a participant when the participant wants to join the ensemble event. Example of profile information may include, but are not limited to age, occupation, date of birth, martial status, number of children, age of children, home town, favorite foods, favorite music (types or artists), preferences, and others. In some implementations, the participant may be provided options to link the profile to an existing Twitter© account, or a Facebook© account etc.

At step 220, a plurality of objects/windows may be displayed on the corresponding user device of each specific participant. Each of the plurality of objects may correspond to one specific ensemble participant. Each of the objects may have a distinct color and/or shape. In some embodiments, different colors and/or shapes of objects/windows may be used to indicate different social graphs of participants according to participants' profile information. In some embodiments, object/window size and audio volume may be used to indicate a specific participant's influential level in an ensemble event. For example, an object/window with a star shape or a larger size than others may correspond to a celebrity or a highly influential participant.

Options may be provided for each specific participant to control the position of its corresponding object/window relative to other objects/windows, at step 230. A specific participant may "move" around different positions within his or her display to chat with neighboring participants at different "locations" to have an intuitive effect on how the participant experiences the different layers within the ensemble experience.

In some embodiments, small icons indicating available online ensemble events may be provided and displayed on the screen of a specific participant's device(s). The specific participant may choose to experience different ensemble events on the same device/screen or multiple devices/screens. In some embodiments, the shape of an icon may indicate the content of the ensemble event. For example, the icon of a football game event may be the shape of a football.

At step 240, an ensemble audio signal may be provided to each specific participant as a function of the audio signals from the plurality of ensemble participants and proximity of other objects with respect to the corresponding object of the specific participant. For example, the closer other participants are to the specific participant, the louder they may be. This could be embodied as a discrete function, e.g., the specific participant may only hear those participants whose windows are immediately to the left and right, and all other participants could be muted. Alternatively, the volume could decrease as a function of distance. In further embodiments, the specific participant may be similarly effecting how others perceive the volume of his or her voices.

Figure 3:
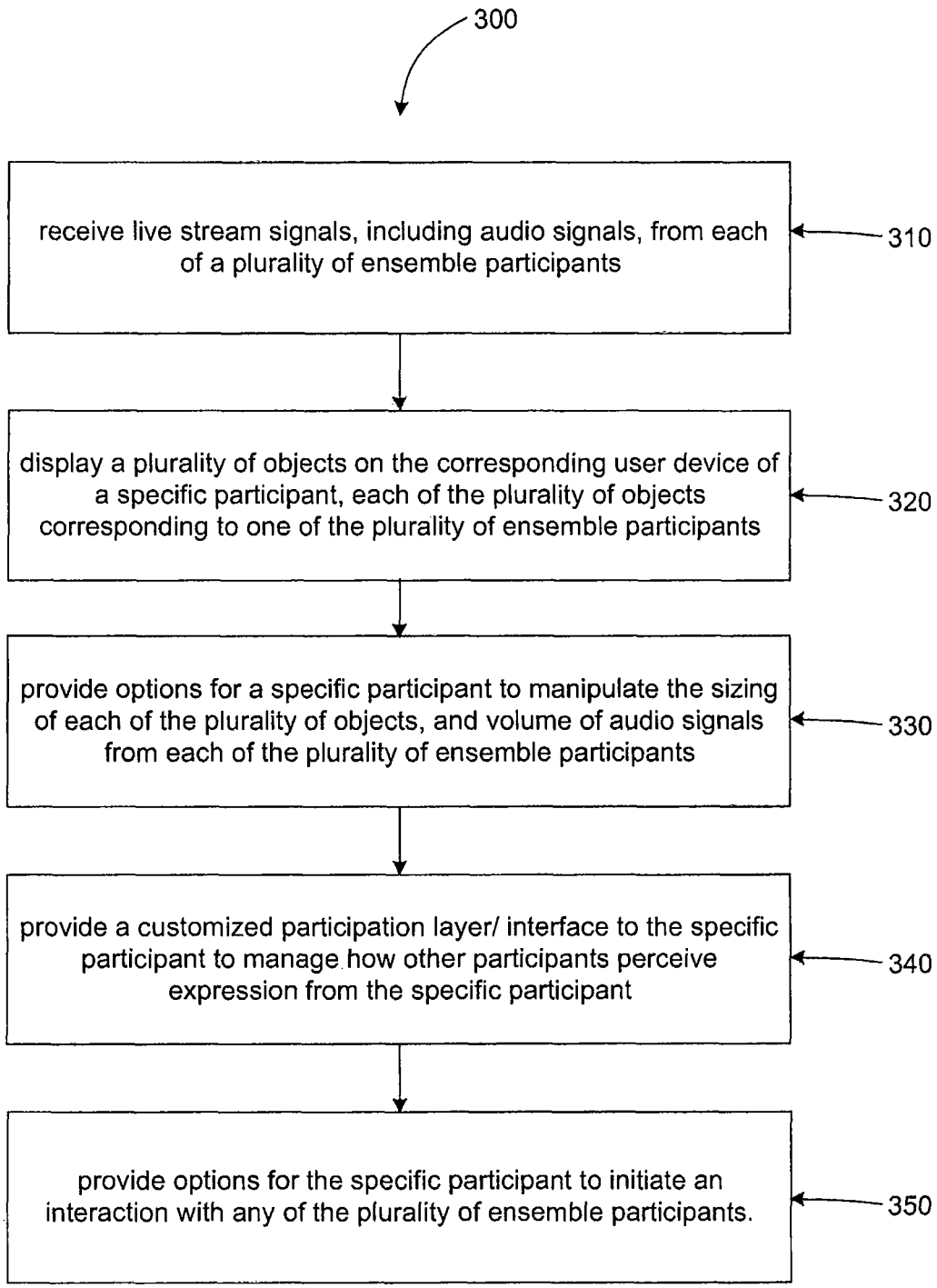
FIG. 3 illustrates a flowchart showing a set of exemplary operations 300 that may be used in accordance with yet another embodiment(s) of the present disclosure.

FIG. 3 illustrates a flowchart showing a set of exemplary operations 300 that may be used in accordance with yet another embodiment(s) of the present disclosure. As illustrated in FIG. 3, live stream signals, including audio signals, may be received from each of a plurality of ensemble participants at step 310. At step 220, a plurality of objects may be displayed on the corresponding user device of each specific participant. Each of the plurality of objects may correspond to one specific ensemble participant.

At step 330, options may be provided for each specific participant to manipulate sizes of each of the plurality of objects, and volume of audio signals from each of the plurality of ensemble participants. In some embodiment, a specific participant may reduce or enlarge the size of any object/window of the plurality of objects/windows on the specific participant's display. The specific participant may increase, reduce, or mute the volume from any of the plurality participants. In some embodiments, the specific participant may only reduce the volume from an announcer or a sponsor to a threshold volume but may not completely mute the volume from the announcer or the sponsor. In some other embodiments, the specific participant may be provided options to add audio of an announcer by paying a fee. Alternatively, the specific participant may be provided options to mute audio of an announcer or a sponsor by paying a fee.

At step 340, a customized participation layer or interface may be provided to a specific participant to manage how other participants perceive the expression from the specific participant. The specific participant may be provided options to manage his or her expression in video and/or audio signals. In some embodiments, the specific participant may be provided options to make his or her object/window translucent over other participants of the ensemble event. In some embodiments, as the specific participant gets more active and provides more feedback in the ensemble event, the size of his or her object/window may become bigger and his or her volume perceived by other participants may become louder.

At step 350, options may be provided for each specific participant to initiate an interaction with any of the plurality of participants. In some embodiment, a participant may be provided options to throw animated objects to a specific participant. The specific participant may get animated objects splashed on his or her screen. In some other embodiments, a participant may be provided options to purchase a variety of animated objects and throw them at any specific participant of the ensemble event to show some emotions, such as anger etc.

Figure 4:
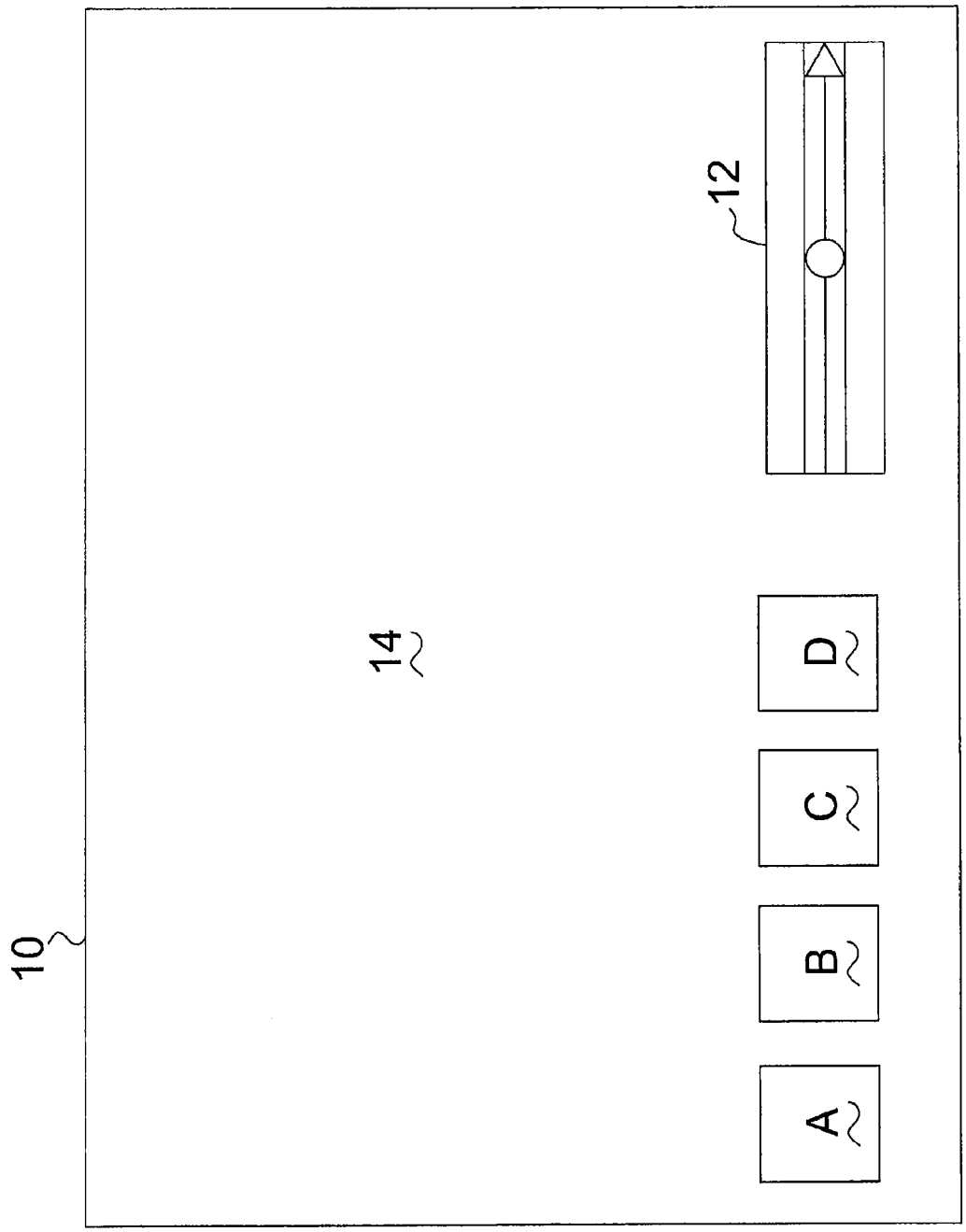
FIGS. 4-6 illustrate a participant interface for an ensemble experience in accordance with yet another embodiment(s) of the present disclosure.
Figure 5:
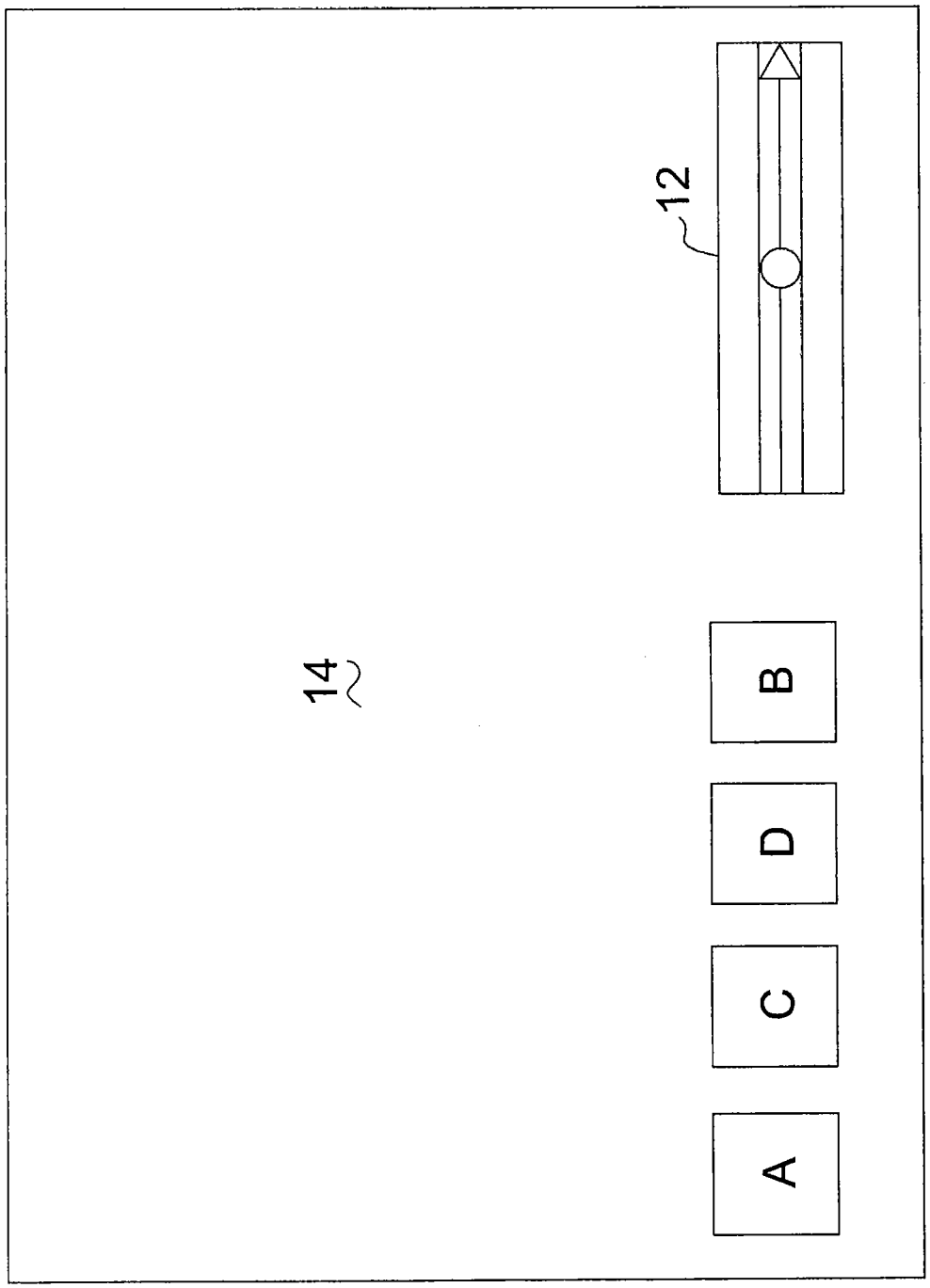
Figure 6:
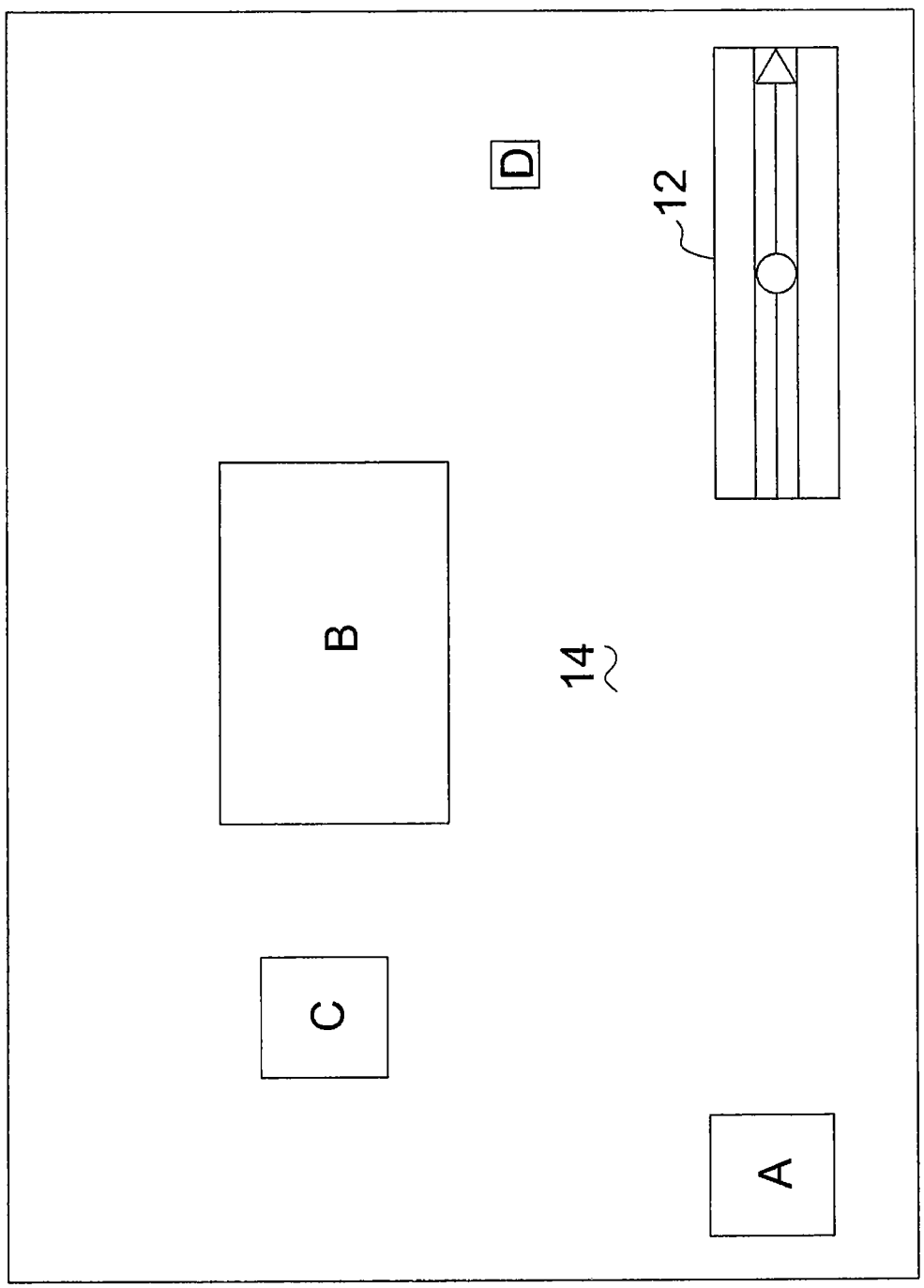

FIGS. 4-6 illustrate a participant interface for an ensemble experience in accordance with yet another embodiment(s) of the present disclosure. In FIGS. 4-6, different stages of an ensemble experience and interface for providing a life-like ensemble experience are illustrated. Example ensemble experiences may include video chat and audio chat. A display device 10 may be of a portable computer, iPad©, iPhone©, netbook, tablet, cell phone etc. Shown in the display 10 are a plurality of objects corresponding to participant A, participant B, participant C, participant D (hereinafter referred to as participant object A, etc.), a volume control 12, and a base content layer 14. The base content layer may represent a live or prerecorded game. Participant objects may be video chat windows, thumbnails, avatars, etc, but generally represent active participants of the ensemble experience. Each object may have an associated audio signal. In one embodiment, the specific participant using display device 10 (sometimes, "the local participant") may control the ensemble audio by manipulating size and position of the different object.

While different results will depend upon the specific implementation, one may imagine a specific one of the objects corresponding to the specific participant, and the closer the other objects are to the specific object, the louder the relevant volume may be with respect to volume from other objects. Assume the specific participant is represented by participant object C. In one embodiment, the ensemble audio at device 10 may include only audio from object B and object D, the immediate left and right objects, with audio from object A muted. Alternatively, object A's volume may be included, but at a lower level.

In FIG. 5, the specific participant has manipulated the objects, and now audio corresponding to object. B may be muted. Additionally, the audio from object A and object D may be sent to left and right speakers, respectively, to provide a stereo sound similar to how a real life experience would present audio.

In FIG. 6, the specific participant has again manipulated the objects, this time manipulating both position and sizing for a desired audio effect.

In another embodiment, the sizing of objects may automatically adjust to correspond to distance from the local participant's object. For example, as a participant selects and moves an object away, the object may shrink and the volume decrease, thus representing how in real world social settings, the farther away someone is, the smaller they appear and their voice is quieter. Other embodiments may allow you to put social characteristics onto participant objects. A friend participant that you know is always loud at a party may have their volume always set at a higher level to mimic real word experience. Still further embodiments would allow for the participant to apply audio and/or visual effects to the objects.

Figure 13A:
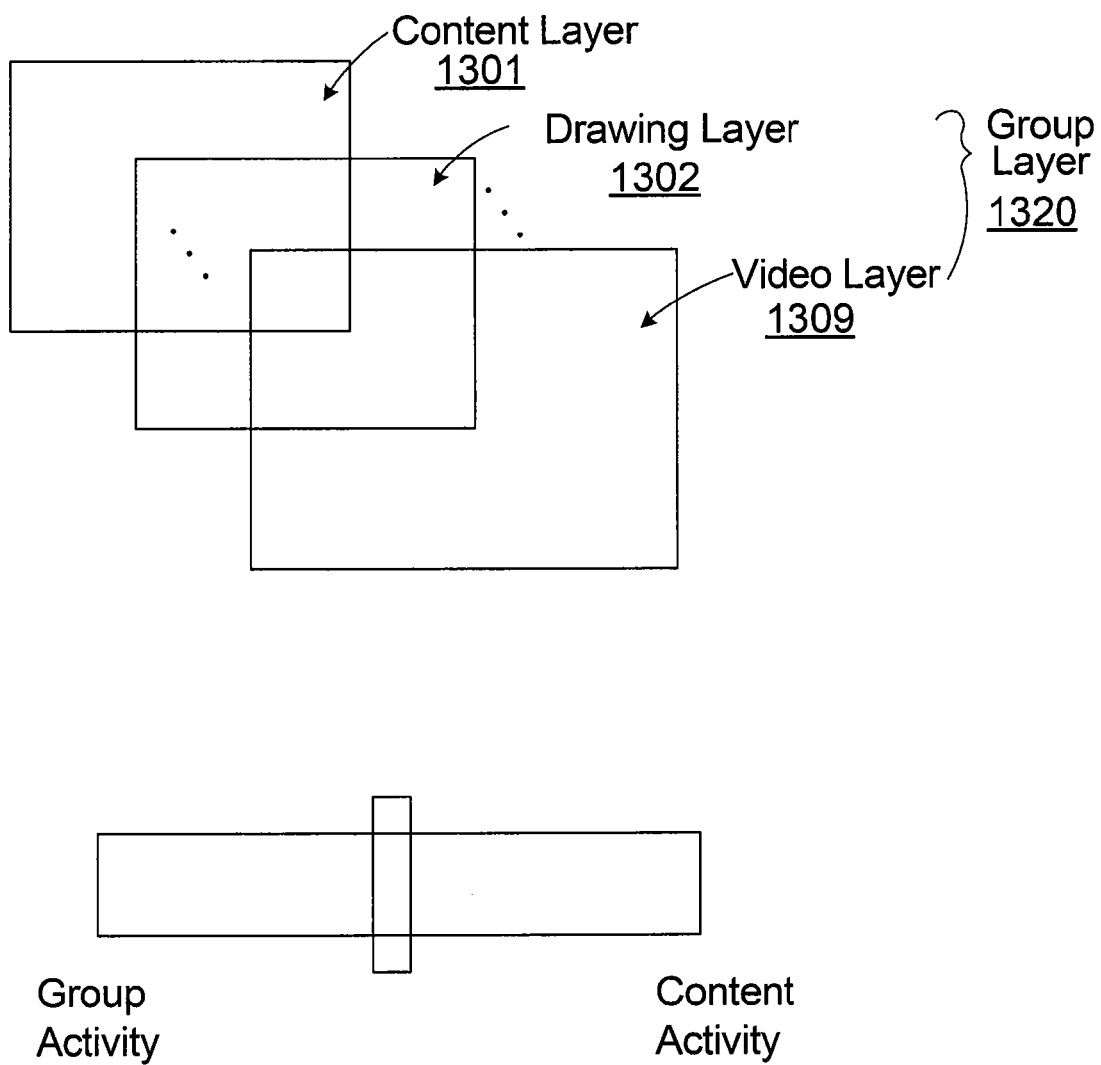
FIG. 13A illustrates an exemplary interface for a specific participant of an online ensemble to adjust volume of audio signals from one or more group layer(s) and a content layer of the online ensemble in accordance with yet another embodiment(s) of the present disclosure.

FIG. 13A illustrates an exemplary interface for a specific participant of an online ensemble to adjust volume of audio signals from one or more group layer(s) 1320 and a content layer 1301 of the online ensemble in accordance with yet another embodiment(s) of the present disclosure. In some embodiments, one or more group layer(s) 1320 may be provided for a specific participant to interact with other participants of the online ensemble. The one or more group layer(s) 1320 may include any interface on which participants of the online ensemble may communicate with each other, for example, a drawing layer 1302, a video, layer 1309, a text chat layer, a voice chat layer, and/or a video chat layer.

Figure 13B:
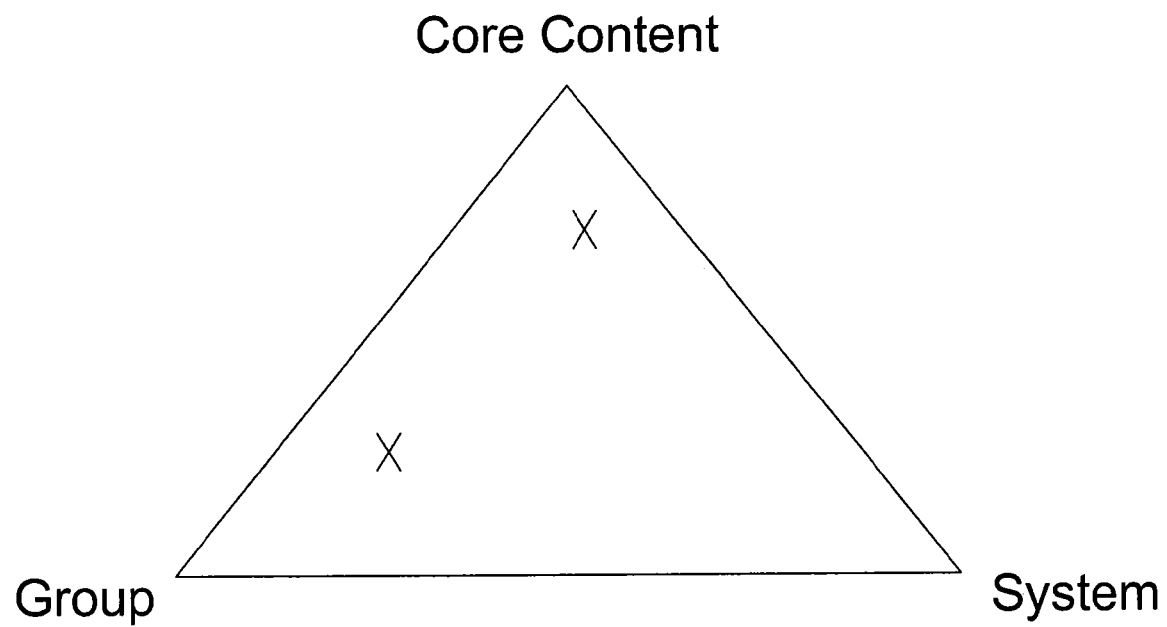
FIG. 13B illustrates an exemplary interface for a specific participant of an online ensemble to assign different weights to audio signals from one or more group layer(s), a content layer of the online ensemble and system feedbacks in accordance with yet another embodiment(s) of the present disclosure.

FIG. 13B illustrates an exemplary interface for a specific participant of an online ensemble to assign different weights to audio signals from one or more group layer(s) 1320, a content layer 1301 of the online ensemble and system feedbacks in accordance with yet another embodiment(s) of the present disclosure. In some embodiments, the specific participant may assign the weights by picking a particular point inside an equilateral triangle of the one or more group layer(s), the content layer and system feedbacks. The particular point corresponds to a specific set of weights for audio signals from the one or more group layer(s), the content layer and system feedbacks. In some implementations, the weight assigned to audio signals of system feedbacks may be equal or larger than a non-zero threshold value.

Figure 7:
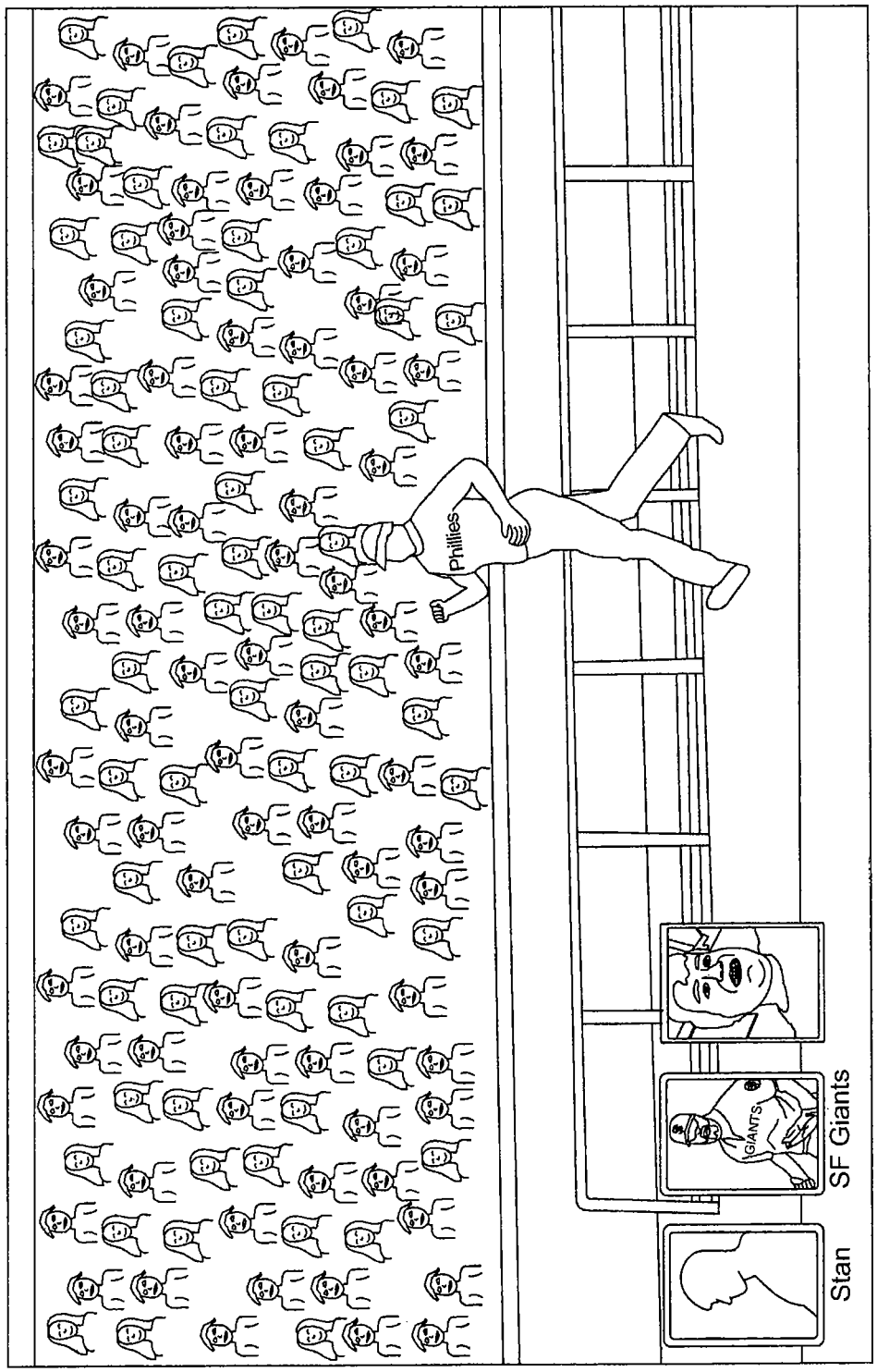
FIGS. 7-12 illustrate a specific video ensemble experience in accordance with yet another embodiment(s) of the present disclosure.

FIGS. 7-12 illustrate a specific embodiment of a video ensemble experience in accordance with yet another embodiment(s) of the present disclosure. FIG. 7 shows three participants are in a video ensemble watching a sports game (the base content layer). Two of the participants are represented by live video, and the third participant is represented by avatar. Note there could be unlimited number of video streams, windows, object, etc.

Figure 8:
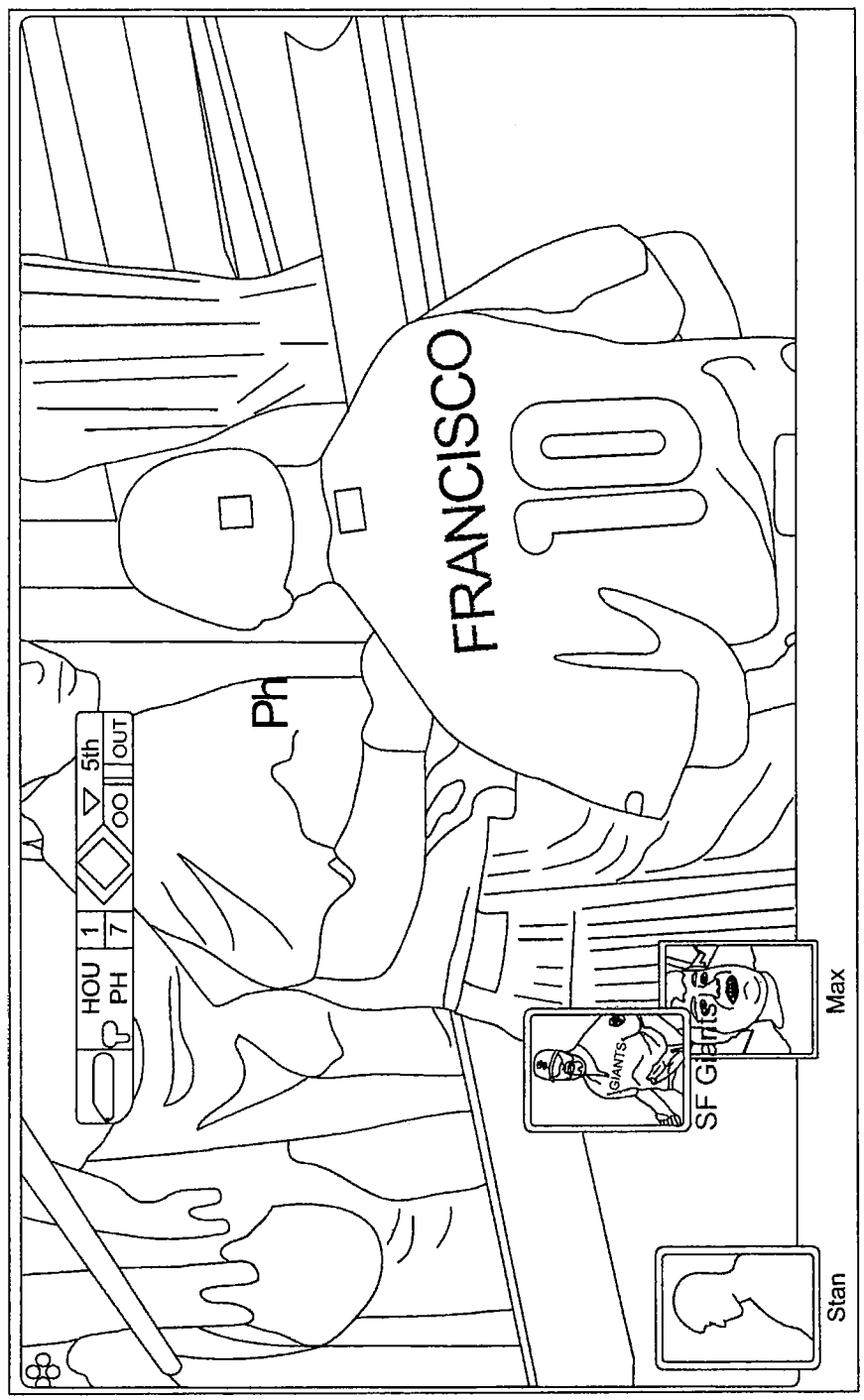
Figure 9:
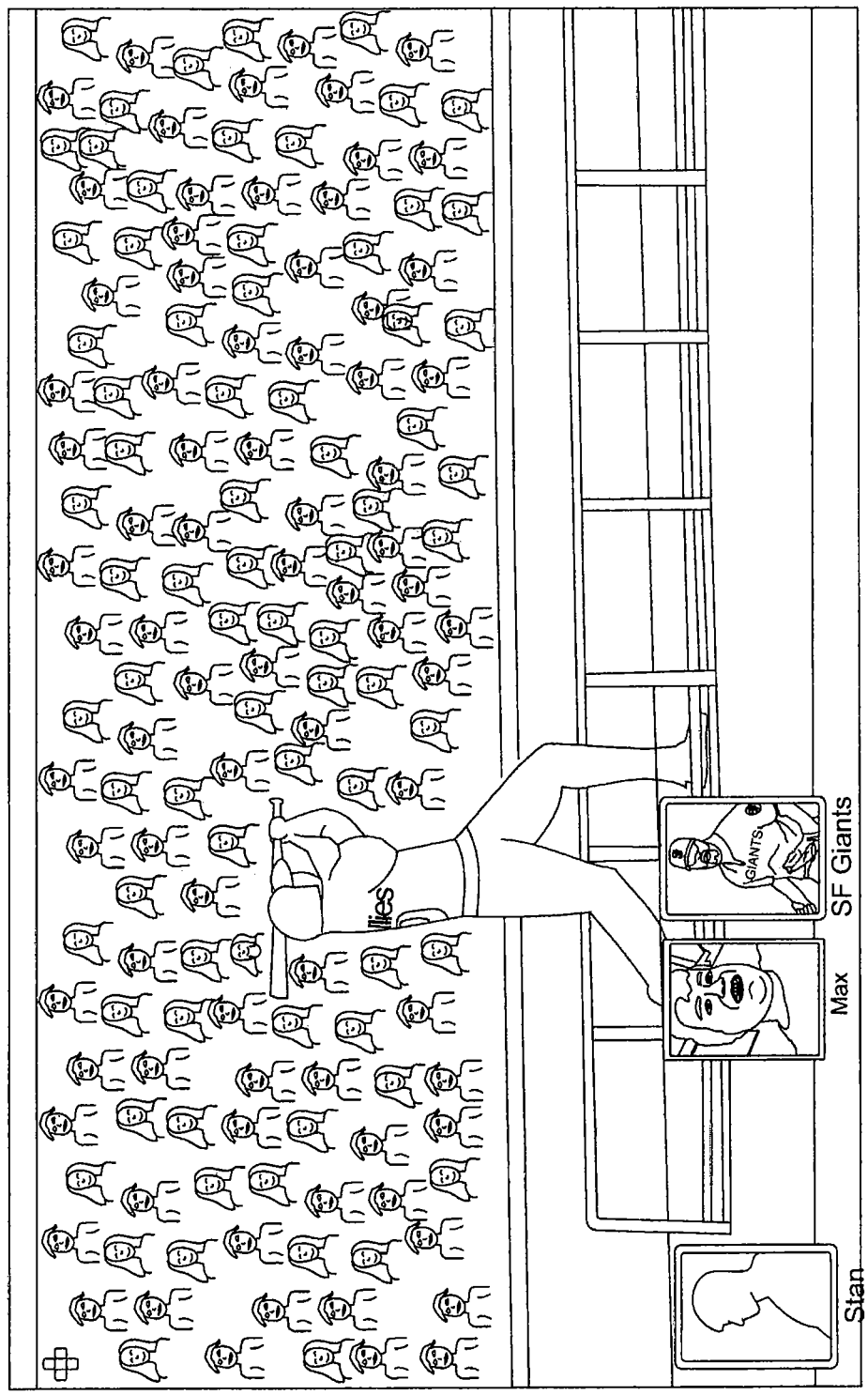

FIGS. 8-9 show that as a participant moves to another position, the audio may change as may the ability to speak to certain people changes. The local participant moved themselves to the right edge, and so in some embodiments the local participant may hear the middle participant well and not hear the left most participant, or hear them with less volume.

Figure 10:
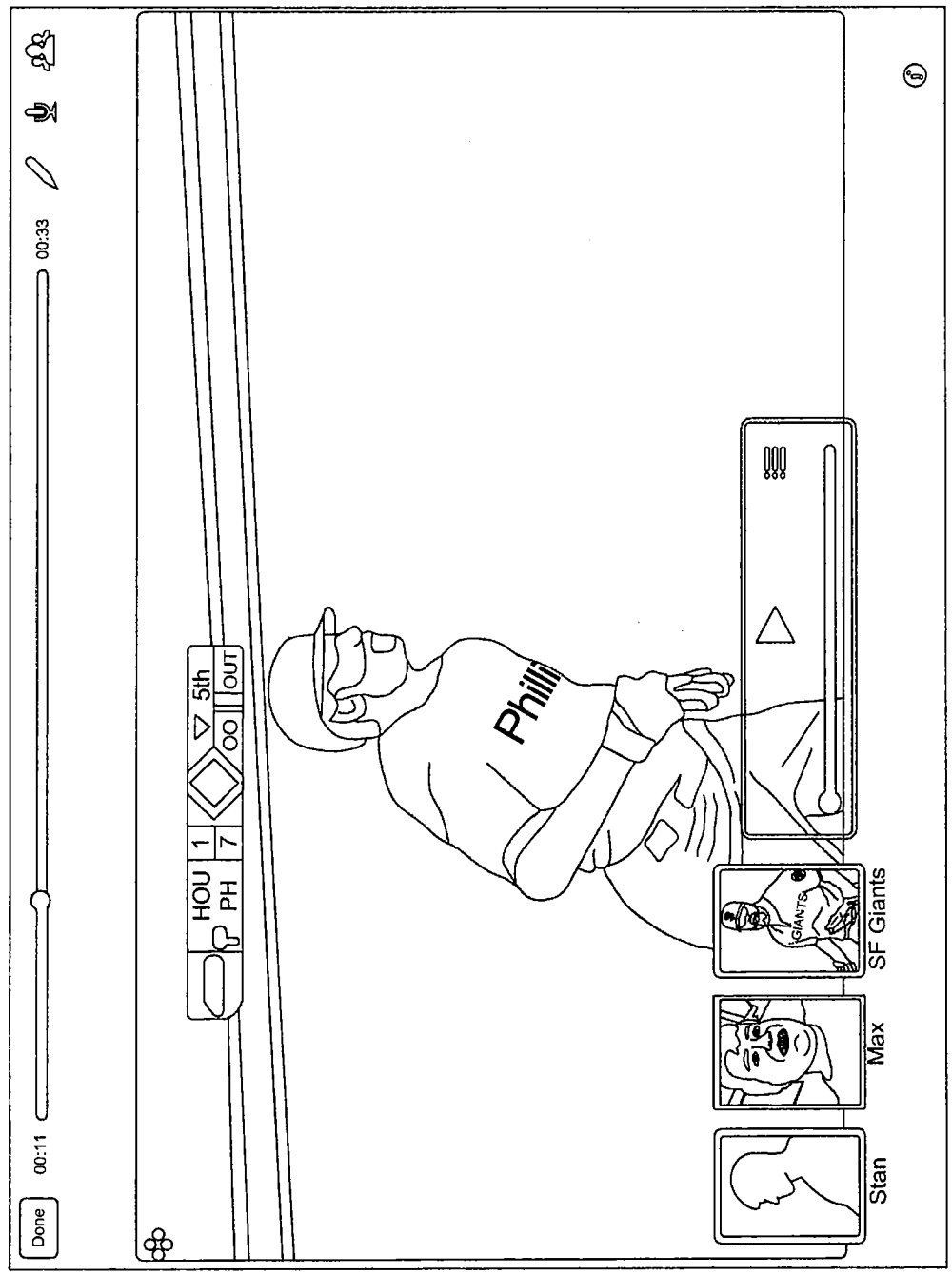
Figure 11:
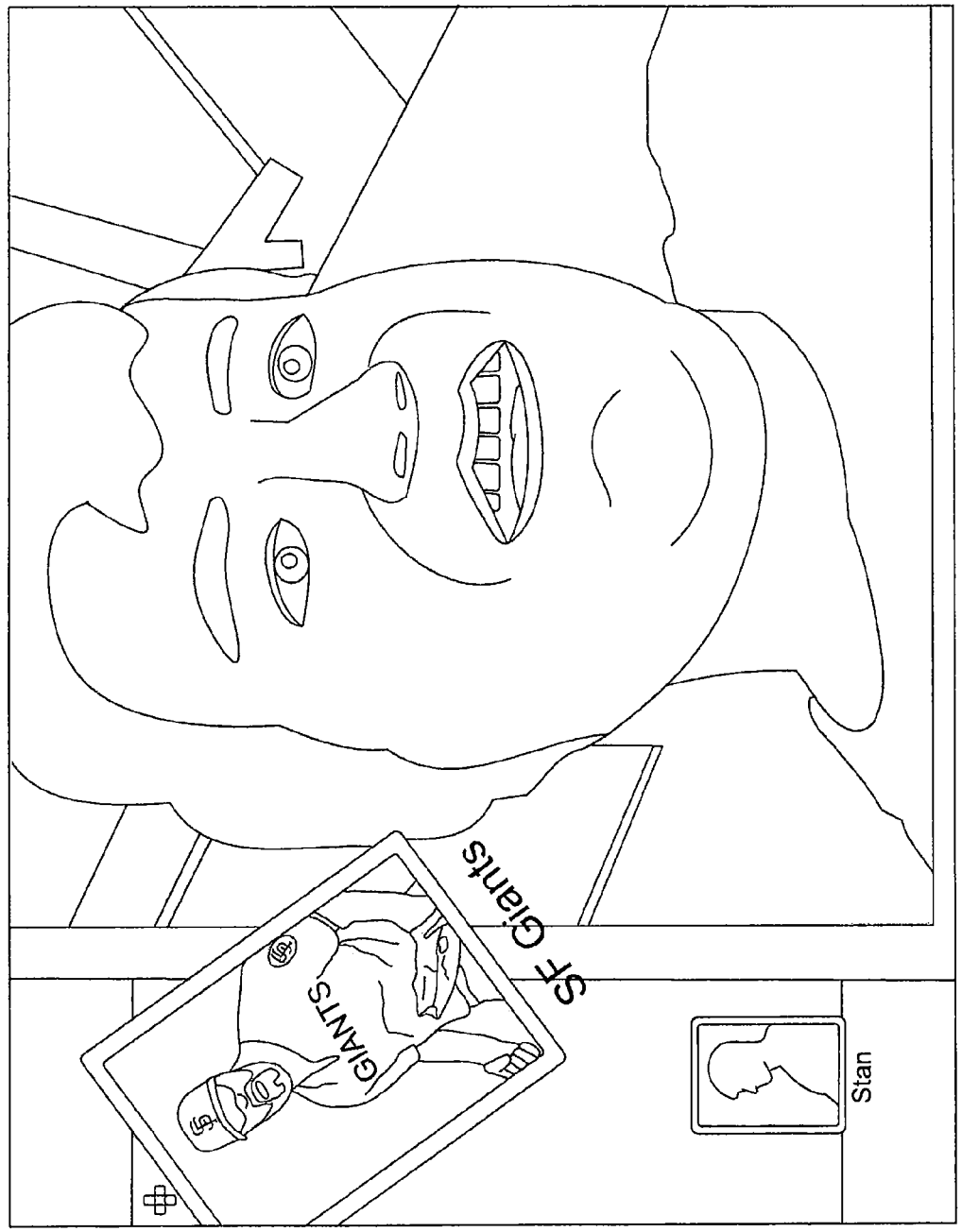
Figure 12:
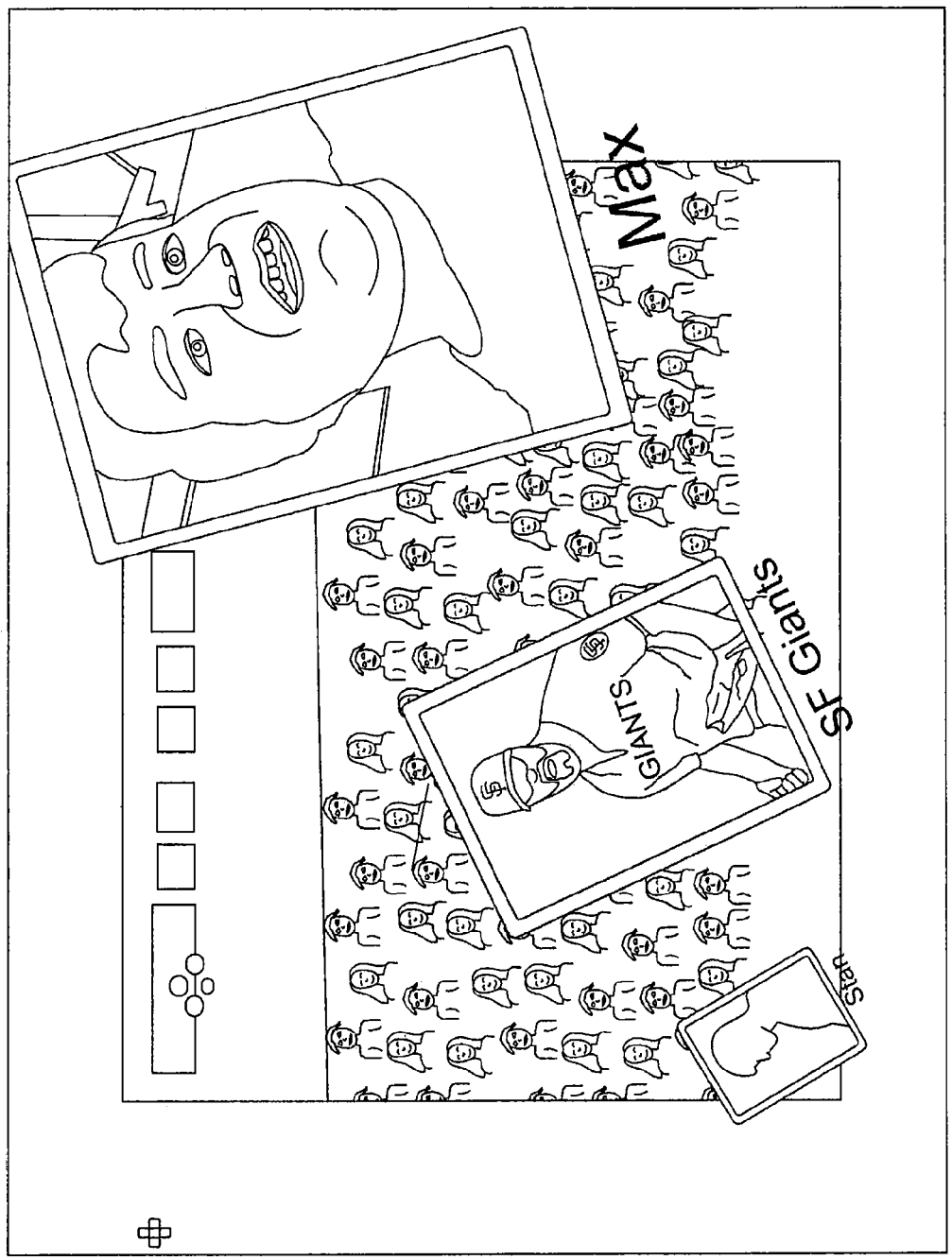

In FIG. 10, the participant manipulation is settled, and so the system auto-aligned the videos, and put the volume control slider back up. FIG. 11 shows that any participant may be made a base layer, in real time live while their video is streaming. FIG. 12 shows audio volume may be based on size of videos and/or on distance between them.

In general, the routines executed to implement the embodiments of the disclosure, may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for the disclosure, are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples—alternative implementations may employ differing values or ranges.

The teaching of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A computer-implemented method for generating a life-like ensemble experience for a specific participant of an online ensemble event, the method comprising:
   receiving live stream signals, including audio signals, from each of a plurality of participants;
   displaying a plurality of objects on a local device of the specific participant, each of the plurality of objects corresponding to one of the plurality of participants;
   providing options for the specific participant to manage the position of its corresponding object relative to other objects; and
   providing one or more group layer(s) to the specific participant for interaction with other participants of the online ensemble; and
   providing options for the specific participant to assign different weights to audio signals from the one or more group layer(s) and a content layer of the online ensemble.

2. The computer-implemented method as recited in claim 1, wherein the one or more group layer(s) includes a drawing layer, a video layer, a text chat layer, a voice chat layer, and/or a video chat layer.

3. The computer-implemented method as recited in claim 2, further comprising: providing options for the specific participant to assign different weights to audio signals from the one or more group layer(s), a content layer of the online ensemble, and system feedbacks from the local device.

4. The computer-implemented method as recited in claim 3, wherein the weight assigned to the audio signals of system feedbacks is equal or larger than a non-zero threshold value.

5. The computer-implemented method as recited in claim 1, wherein the closer a given object of the plurality of objects is to the specific object corresponding to the specific participant, the louder volume of the given object's audio signal is.

6. The computer-implemented method as recited in claim 5, wherein volume of any object disposed within a certain distance of the specific object is proportional to actual distance from the specific object.

7. The computer-implemented method as recited in claim 1, further comprising enabling the specific participant to manipulate sizing of the plurality of objects, and wherein the ensemble audio signal is a function of the sizing of the plurality of objects.

8. A system for generating a life-like ensemble experience for a specific participant of an online ensemble event, comprising:
   one or more processors; and
   a non-transitory computer-readable storage medium storing one or more computer programs which, when executed by the one or more processors, cause the one or more processors to perform a set of operations for generating the life-like ensemble experience for the specific participant, the one or more computer programs comprising:
   instructions to receive live stream signals, including audio signals, from each of a plurality of participants;
   instructions to display a plurality of objects on a user device of the specific participant, each of the plurality of objects corresponding to one of the plurality of participants;
   instructions to provide options for the specific participant to manage the position of its corresponding object relative to other objects;
   instructions to provide one or more group layer(s) to the specific participant for interaction with other participants of the online ensemble; and
   instructions provide options for the specific participant to assign different weights to audio signals from the one or more group layer(s) and a content layer of the online ensemble.

9. The system as recited in claim 8, wherein the one or more group layer(s) includes a drawing layer, a video layer, a text chat layer, a voice chat layer, and/or a video chat layer.

10. The system as recited in claim 9, wherein the one or more computer programs further comprises instructions to provide options for the specific participant to assign different weights to audio signals from the one or more group layer(s), a content layer of the online ensemble, and system feedbacks from the local device.

11. The system as recited in claim 10, wherein the weight assigned to the audio signals of system feedbacks is equal or larger than a non-zero threshold value.

12. The system as recited in claim 8, wherein the closer a given object of the plurality of objects is to the specific object corresponding to the specific participant, the louder volume of the given object's audio signal is.

13. The system as recited in claim 12, wherein volume of any object disposed within a certain distance of the specific object is proportional to actual distance from the specific object.

14. The system as recited in claim 8, wherein the one or more computer programs further comprises instructions to enable the specific participant to manipulate sizing of the plurality of objects, and wherein the ensemble audio signal is a function of the sizing of the plurality of objects.

15. A computer-implemented method for providing attention management for a specific participant in an online ensemble event, the method comprising:
receiving live stream signals, including audio signals, from each of a plurality of participants;
displaying a plurality of objects on the corresponding local device of the specific participant, each of the plurality of objects corresponding to one of the plurality of participants;
providing options for the specific participant to manipulate the size of each of the plurality of objects and volume from the plurality of participants; providing one or more group layer(s) to the specific participant for interaction with other participants of the online ensemble; and
providing options for the specific participant to assign different weights to audio signals from the one or more group layer(s) and a content layer of the online ensemble.

16. The computer-implemented method as recited in claim 15, wherein the one or more group layer(s) includes a drawing layer, a video layer, a text chat layer, a voice chat layer, and/or a video chat layer.

17. The computer-implemented method as recited in claim 16, further comprising: providing options for the specific participant to assign different weights to audio signals from the one or more group layer(s), a content layer of the online ensemble, and system feedbacks from the local device.

18. The computer-implemented method as recited in claim 17, wherein the weight assigned to the audio signals of system feedbacks is equal or larger than a non-zero threshold value.

19. The computer-implemented method as recited in claim 18, further comprising providing options for the specific participant to initiate an interaction with a selected participant of the plurality of participants.

20. The computer-implemented method as recited in claim 19, wherein the interaction includes throwing an animated object to the screen of the selected participant.

21. The computer-implemented method as recited in claim 15, further comprising providing options for the specific participant to make a specific object translucent over objects corresponding to other participants, the specific object corresponding to the specific participant.

22. The computer-implemented method as recited in claim 21, wherein the options to make the object translucent includes changing the color, shape, and/or size of the object, or temporarily making the object swell and/or flash.

23. A system for generating a life-like ensemble experience for a specific participant of an online ensemble event, comprising:
one or more processors; and
a non-transitory computer-readable storage medium storing one or more computer programs which, when executed by the one or more processors, cause the one or more processors to perform a set of operations for generating the life-like ensemble experience for the specific participant, the one or more computer programs comprising:
instructions to receive live stream signals, including audio signals, from each of a plurality of participants;
instructions to display a plurality of objects on a user device of the specific participant, each of the plurality of objects corresponding to one of the plurality of participants;
instructions to provide options for the specific participant to manipulate the size of each of the plurality of objects and volume of audio signals from the plurality of participants;
instructions to provide one or more group layer(s) to the specific participant for interaction with other participants of the online ensemble; and
instructions provide options for the specific participant to assign different weights to audio signals from the one or more group layer(s) and a content layer of the online ensemble.

24. The system as recited in claim 23, wherein the one or more group layer(s) includes a drawing layer, a video layer, a text chat layer, a voice chat layer, and/or a video chat layer.

25. The system as recited in claim 24, wherein the one or more computer programs further comprises instructions to provide options for the specific participant to assign different weights to audio signals from the one or more group layer(s), a content layer of the online ensemble, and system feedbacks from the local device.

26. The system as recited in claim 25, wherein the weight assigned to the audio signals of system feedbacks is equal or larger than a non-zero threshold value.

27. The system as recited in claim 26, wherein the one or more computer programs further comprise instructions to provide options for the specific participant to initiate an interaction with a selected participant of the plurality of participants.

28. The system as recited in claim 27, wherein the interaction includes throwing an animated object to the screen of the selected participant.

29. The system as recited in claim 28, wherein the one or more computer programs further comprise instructions to provide options for the specific participant to make a specific object translucent over objects corresponding to other participants, the specific object corresponding to the specific participant.

30. The system as recited in claim 29, wherein the options to make the object translucent includes changing the color, shape, and/or size of the object, or temporarily making the object swell and/or flash.

31. An apparatus for providing attention management for a specific participant in an online ensemble event, the apparatus comprising:
means for receiving live stream signals, including audio signals, from each of a plurality of participants;
means for displaying a plurality of objects on the corresponding local device of the specific participant, each of the plurality of objects corresponding to one of the plurality of participants;
means for providing options for the specific participant to manipulate the size of each of the plurality of objects and volume from the plurality of participants;

means for providing one or more group layer(s) to the specific participant for interaction with other participants of the online ensemble; and means for providing options for the specific participant to assign different weights to audio signals from the one or more group layer(s) and a content layer of the online ensemble.

\* \* \* \* \*